United States Patent
Bickel

(10) Patent No.: US 6,938,183 B2
(45) Date of Patent: Aug. 30, 2005

(54) FAULT TOLERANT PROCESSING ARCHITECTURE

(75) Inventor: Robert E. Bickel, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 621 days.

(21) Appl. No.: 09/960,152

(22) Filed: Sep. 21, 2001

(65) Prior Publication Data

US 2003/0061535 A1 Mar. 27, 2003

(51) Int. Cl.[7] .............................................. G06F 11/00
(52) U.S. Cl. ........................................ 714/12; 714/797
(58) Field of Search .............................. 714/10, 11, 12, 714/37, 797

(56) References Cited

U.S. PATENT DOCUMENTS

| | | | | |
|---|---|---|---|---|
| 4,745,302 A | * | 5/1988 | Hanawa et al. ............. 327/160 |
| 5,537,655 A | * | 7/1996 | Truong ......................... 714/12 |
| 5,889,940 A | | 3/1999 | Liddell et al. | |
| 6,073,251 A | | 6/2000 | Jewett et al. | |
| 6,141,770 A | * | 10/2000 | Fuchs et al. ................... 714/11 |
| 6,247,143 B1 | * | 6/2001 | Williams ........................ 714/11 |
| 6,637,005 B1 | * | 10/2003 | Kohnen ........................ 714/797 |
| 6,671,841 B1 | * | 12/2003 | Golshan ....................... 714/729 |
| 2002/0095641 A1 | * | 7/2002 | Cartagena ................... 714/797 |
| 2002/0129296 A1 | * | 9/2002 | Kwiat et al. .................. 714/10 |

FOREIGN PATENT DOCUMENTS

EP   1 146 423 A2 * 10/2001 ........... G06F/11/18

* cited by examiner

*Primary Examiner*—Scott Baderman

(57) ABSTRACT

A fault tolerant processing circuit comprising at least three processor groupings, a synchronizing circuit and a fault logic circuit. Each of the processor groupings have a plurality of processor grouping inputs and a plurality of processor grouping outputs. The synchronizing circuit comprises a plurality of output synchronizers, wherein each output synchronizer communicates with a corresponding respective processor grouping for synchronizing the output of each processor grouping. A fault logic circuit communicates with the synchronizing circuit. The fault logic circuit comprises a fault detection circuit and a fault mask circuit. The fault logic circuit compares the plurality of processor group outputs to detect errors in any one of the plurality of processor group outputs. An error is detected when none of the at least three processor groups is in a majority of the processor groups. Upon a detected fault, the fault mask circuit masks the output of the respective processor grouping associated with a detected error and signals a detected error. The error signal latch is then used to reset the processor groupings.

13 Claims, 3 Drawing Sheets

FAULT TOLERANT PROCESSING ARCHITECTURE

TECHNICAL FIELD

The present invention relates generally to fault tolerant computer processors, and more particularly, to a voted processing system.

BACKGROUND ART

The natural radiation environment on Earth and in space can often cause short term and long term degradation of semiconductor devices used in computers. This hazard is a problem for computers where fault-free operation is required. In addition to these radiation effects, computer chips are subject to random failures due to undetected defects and weaknesses that evolve over the course of time. Trace radioactive materials in semiconductor packages may also cause faults.

When computers must operate for long periods in a remote environment, or where these devices must operate without fault for long periods of time, the need for systems that are protected from faults or failure becomes critical. Systems that operate in Earth orbit and beyond are especially vulnerable to this radiation hazard.

sThe presence of cosmic rays and particularly high-energy particles in space can produce a disturbance called a single event effect (SEE) or a single event upset (SEU). When high-energy particles penetrate a semiconductor device, they deposit charge within the computer circuit and create transients and/or noise. This phenomenon can "upset" the memory circuits. One type of upset occurs when a single bit of data stored in the chip's memory changes its value due to radiation. In this instance, a logical value of "one" can change to a logical value of "zero" and vice versa. An upset may be generally defined as a misstated output of a component. This output may comprise one or more signal bits.

The number and susceptibility to upset of the embedded storage elements drives computer transient fault rates. The upset rate of computer systems is dominated by unprotected main memory. Upsets in main memory can be protected by error correction codes (ECC) stored in added memory components. Once this effective technique is employed, the processors and associated "backside" caches become the predominant source of upsets.

Traditional approaches to improving system reliability attempt to prevent faults by design improvements, improved component quality and/or component shielding from environmental effects by radiation hardening. Radiation hardened devices, however, tend to be much more expensive and slower than conventional chips. They typically lag the state-of-the-art by several years.

Redundancy, at the computer level, is often used to improve system reliability as well. These highly redundant systems, however, are also very costly, due the number of components that are necessarily replicated.

Alternative approaches using redundancy at the processor component level can be very costly due to the added signal propagation delays introduced. These propagation delays force slowing of the speeds at which the processors can interact with system buses. This results in lower overall computer performance in throughput and IO bandwidth. The consequence to the overall system is a requisite greater number of redundant computer systems than in non-redundant systems. And in extreme cases, certain embedded applications cannot be fielded due to inability to meet very low latency computational requirements.

For some applications, such as operator critical systems, computer control systems must be able to operate reliably in the presence of multiple faults. These applications are not addressed by traditional voting methods which determine single signal output values, or sets of single signal output values, independent of the correctness of other related signal values. More sophisticated schemes are required such as consideration of majority agreement among entire processing engines.

In most instances, these applications also prevent propagation of errors beyond the fault detection and fault masking boundaries and into the main memory and I/O systems when correct operation is overwhelmed by multiple faults. Under these circumstances, computer control systems must be able to reliably halt and preclude perpetuation of faulty operation. Current state of the art processing element voting schemes do not provide reliable operation for this class of systems.

Accordingly, there is a need for a fault tolerant digital system that is capable of detecting faults, preventing their propagation through the system, and restoring proper operation to the faulty component(s), without significantly degrading the computational performance provided by unprotected, equivalent, commercial systems.

SUMMARY OF THE INVENTION

It is, therefore, an object of the invention to protect the computer system from upsets and to remove transient faults from the processor and associated elements. It is also the object of the invention to detect the faults in the processor and associated elements, reliably prevent their propagation through the computer system, and respond by restoring normal computational behavior. This shields the computer memory and all I/O from upsets in the primary compute elements and provides autonomy in the presence of uncorrectable fault scenarios. A combination of hardware and software is employed to prevent erroneous computer outputs and to remove accumulated transient faults. This is done to provide an improved fault tolerant digital processing system having high reliability.

In one embodiment of the invention, there is a fault tolerant processing circuit comprising three substantially identical processor groupings, a synchronizing circuit and a fault logic circuit. Each of the processor groupings is executing substantially identical software in a substantially identical processing environment. In the absence of faults, the outputs of each of these processor groupings are substantially identical on a clock by clock basis. Each of the processor groupings has a plurality of processor grouping inputs and a plurality of processor grouping outputs. The synchronizing circuit includes a plurality of output synchronizers. Each output synchronizer communicates with a corresponding respective processor grouping for synchronizing the output of each processor grouping.

A fault logic circuit communicates with the synchronizing circuit. The fault logic circuit includes a fault detection circuit and a fault mask circuit. The fault detection circuit compares the plurality of processor group outputs and signals the minority/majority status of each processor group output. The fault mask circuit creates majority processor group outputs from each of the processor group outputs. This resultant majority processor group output is identical to the output of any of the processor group outputs that have no observed output errors. When a majority of the processor grouping outputs are fault free, and thus identical, the resultant majority processor group outputs are identical to the outputs of any of the majority processor grouping outputs. This majority is referred to as the fault free processor group outputs.

Upon detecting a fault, the fault detection logic latches the state of the fault. This fault state, in combination with fault configuration control logic, is used to signal a processor mismatch to the processor groupings for software response, or to signal a fatal fault (no majority agreement in output vectors) to the no majority control logic.

Operating continuously, the fault mask circuit masks the outputs of all the respective processor groupings and allows continued non-faulty execution of the software of a majority of the processor groupings. In the presence of majority processing, the resultant output of the fault mask circuitry represents a virtual processor executing the identical software, as executed by each of the individual processor groupings.

Upon detecting a difference between output vectors among any one of the plurality of processor group outputs, the fault detection logic signals a processor mismatch to each processor group. Each processor group responds to the processor mismatch signal with a software response that resynchronizes the processor groupings to identical operation. After resynchronization, each processor grouping continues transient, fault-free operation from the point at which resynchronization was performed.

Upon detecting a fatal fault, the "no majority control" logic causes the computer system to request toggle, request switch to a backup system, and to reset the system with the fatal fault. This logic resets the system before the effects of the fault can propagate to the I/O and memory systems of the computer system.

In conjunction with the fault tolerant processing circuitry, fault detection, recovery, and latent fault scrubbing software is installed on and executed by the virtual processor.

The fault detection software, invoked by the processor mismatch signal (Interrupt), responds by saving the internal state of the majority (Fault free) processor groupings to the virtual processor memory and commanding a processor groupings only reset.

Executing on each processor grouping in response to the processor groupings only reset and upon determining that recovery is required, the recovery software is initiated. The recovery software restores the majority processor grouping state to each processor grouping. Then, the recovery software restores execution of each processor grouping software section to the point just after the fault detection software saved the internal state of the majority processor groupings. This recovery describes the "return from interrupt".

The latent fault scrubbing software is invoked periodically in order to prevent accumulation of unobserved faults in the processing groupings. This software uses the same techniques as the fault detection and fault recovery software to restore transient fault free operation to each processor grouping. This software is invoked periodically with an execution rate tuned for the desired degree of protection from transient upsets.

The present invention thus achieves improvements over non-pipelined, non-fault correlating (output vector comparison) voted processing systems. The present invention is advantageous in that it allows the use of full speed, commercial, non-radiation hardened components to be used in a system operating in a fault inducing environment, operating through single and multiple faults and preventing fault propagation in the presence of multiple fault scenarios.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
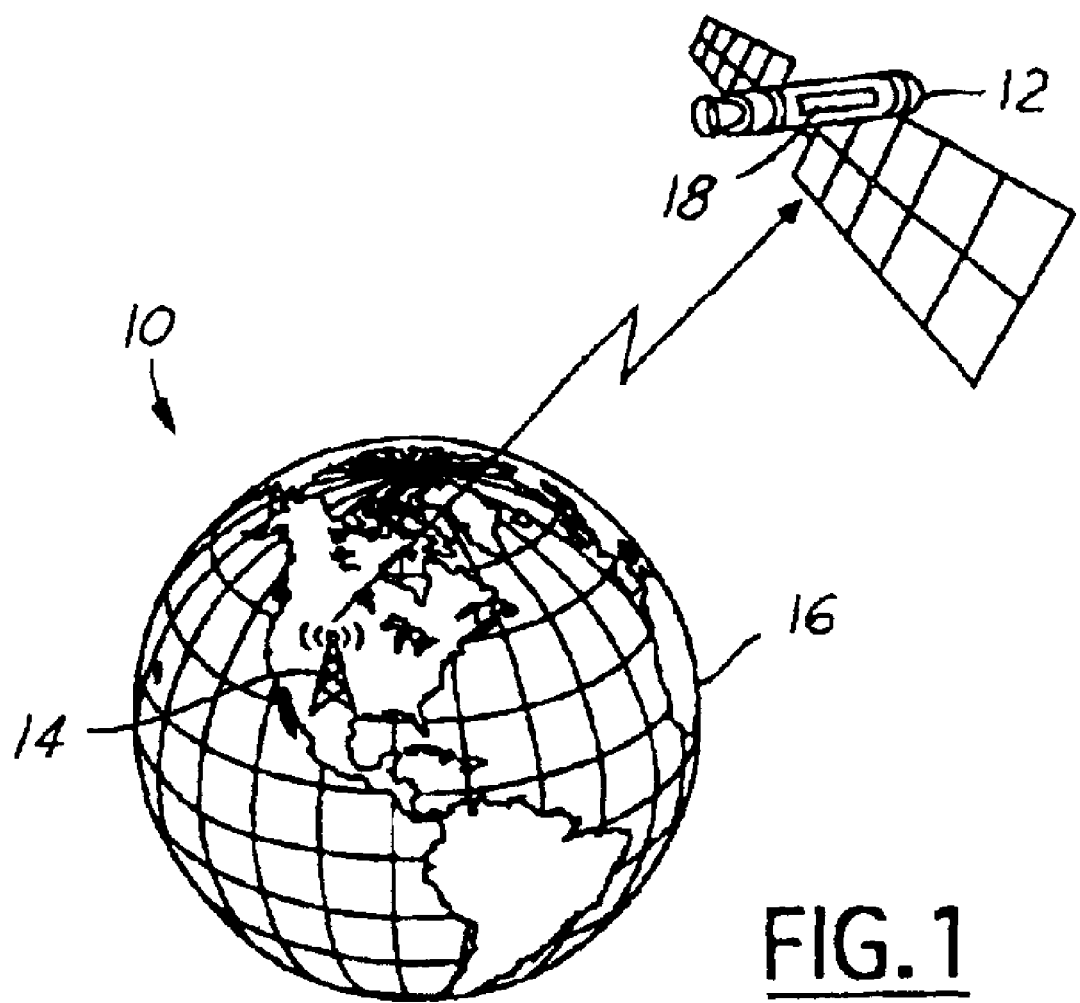
FIG. 1 depicts a satellite system in which a fault tolerant digital processing system in accordance with the present invention may be utilized to advantage.

Referring to FIG. 1, a satellite system 10 in which a fault tolerant digital processing system in accordance with the present invention might be utilized is illustrated. The satellite system 10 is comprised of one or more satellites 12 in communication with a ground station 14 located on the Earth 16. Each satellite 12 contains one or more fault tolerant digital processing system 18.

The satellite system 10 is responsible for ensuring correct processor operation while being subjected to radiation. Integrated circuits used in computers and other electronic systems aboard space vehicles are susceptible to a phenomenon known as Single Event Upset, or SEU. Single Event Upset occurs when radiation, passing through an integrated circuit, deposits stray charges in the device, causing one of its registers or memory elements to be disrupted. Several fault prevention techniques can be utilized to reduce the number of SEUs that occur in the integrated circuits used aboard space vehicles, but these conventional techniques have several disadvantages as discussed above.

Figure 2:
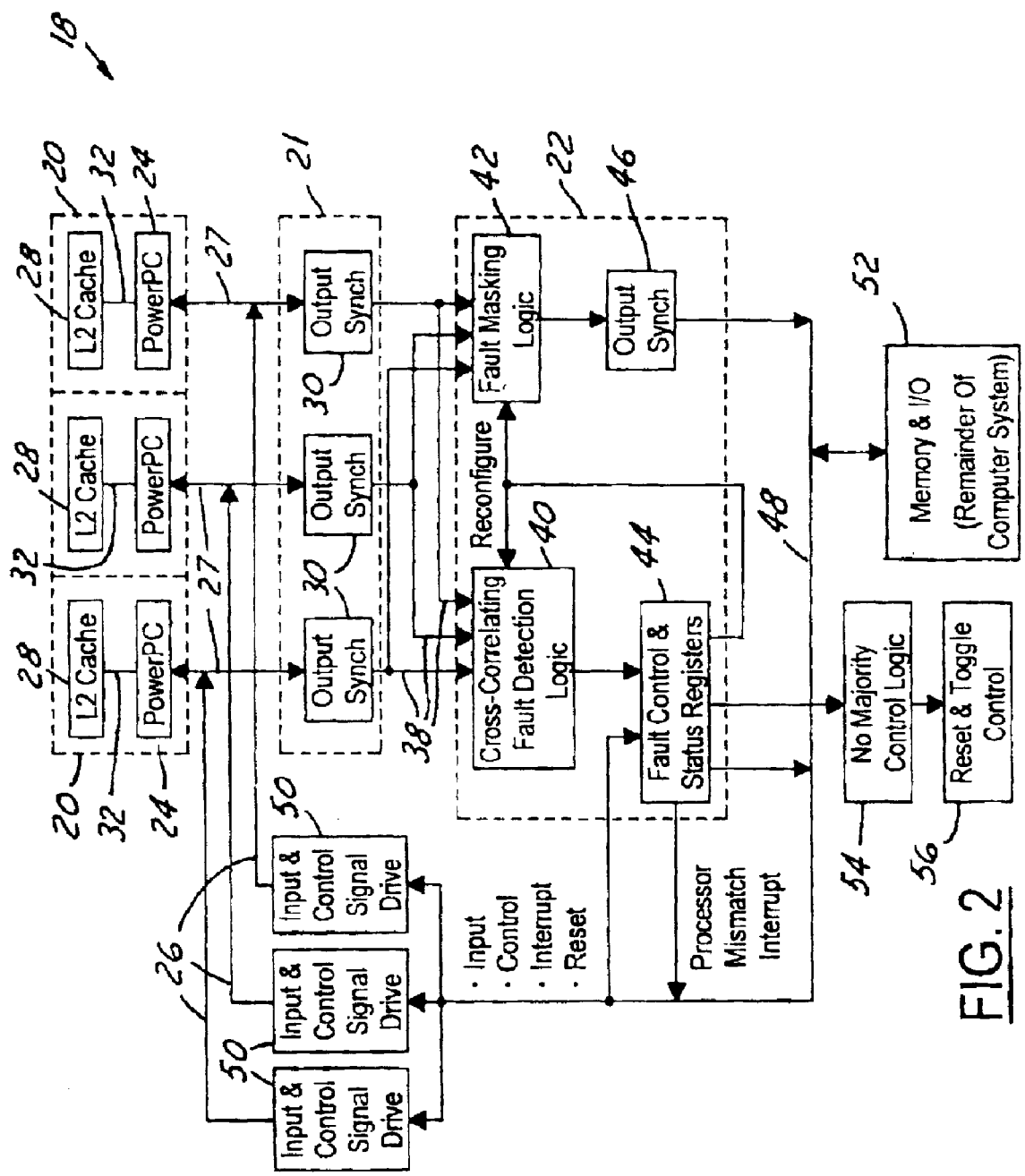
FIG. 2 schematically illustrates fault tolerant digital processing system hardware in accordance with one embodiment of the present invention.

Referring to FIG. 2, a schematic of a fault tolerant digital processing system 18, illustrated also in FIG. 1, in accordance with one embodiment of the present invention, is illustrated. Fault tolerant digital processing system 18 includes three processor groupings 20 coupled to an output synchronizing circuit 21, which is coupled to a fault logic stage 22. Each processor grouping 20 includes a microprocessor 24 (here illustrated as a PowerPC) and an L2 cache 28 (support logic device) and has a plurality of processor grouping inputs and outputs.

In one preferred embodiment of the present invention, three processor groupings 20 are used, however, one skilled in the art would recognize that any number of processor groupings greater then three may be used. In another embodiment of the present invention, two processor groupings may be used to provide failsafe detection of faults with no fault correction. Although shown in FIG. 2 as comprising a microprocessor 24 and an L2 cache 28, each processor grouping 20 could represent any combination of one or more of the following: a microprocessor, a microprocessor with a support logic device, a microprocessor with associated glue logic, a CPU, a CPU with a support logic device, a CPU with associated glue logic, a computer system, a sequencer, a finite state machine or combinations of the aforementioned devices. These components may include a memory system, a memory controller, a system memory, or a bus interface controller. In other words, the processor groupings 20 represent any means for processing a digital data stream.

In an alternate embodiment, finite state machines are included. With these, referenced software does not necessarily exist. In a case without software, the processor mismatch signal (Interrupt) is used to first generate a synchronizing signal (possibly a reset or a synchronizing stream of inputs used to restore a known state) and subsequently generate the state of the majority of the processor groupings.

In most redundant computing architectures, redundant processor groupings are identical. In the present system, however, in view of the fault detection logic described in more detail below, it is not necessary that each processor groupings 20 be identical. Thus, for example, two of the processor groupings may comprise radiation hardened microprocessors while the third may be conventional, or not populated at all (Useful for the failsafe feature without autonomous recovery), thereby reducing the overall cost of implementing the fault tolerant digital processing system.

Referring again to FIG. 2, each microprocessor 24 and L2 cache 28 in a processor grouping 20 receives a clock signal from the input control and signal drive 50 through the input control and signal drive bus 26 and executes an operating step, which may be comprised of multiple serial and parallel operations, during a clock cycle of the clock signal from the input control and signal drive 50. The input control and signal drive bus 26 also provides input to the PowerPCs 24. Each microprocessor 24 operates synchronously, each operating step of each microprocessor 24 being accomplished in parallel and substantially simultaneously with each other microprocessor 24 for each clock cycle. Each processor grouping 20 is also operatively coupled to the synchronizing circuit 21 which comprises a respective output synchronizing logic unit 30 for each processor grouping 20.

In order for the output bus line 27 to run at maximum speed, the synchronizing circuit 21 separates the processing group outputs from the additional fault logic. The output bus line 27 is a bi-directional line which provides output from the PowerPcs 24. This removes the logic delays imposed by the fault logic 22 on the output bus line 27 from the timing signals and allows processor grouping operating speeds to be independent of the encompassing architecture and added fault control circuitry. The synchronizing circuit 21 further includes logic operative to synchronize a JTAG TCLK with the processor system clock. Synchronization of the processor and test access (JTAG TCLK) clocks prevents spurious fault injection. Unsynchronized oscillator clock edge drift introduces input stimulus differences among the processor groupings. This is caused by part input buffer and signal trace differences during processor test access. The synchronizing circuit operates efficiently with continuously active synchronization signals, periodically active synchronization signals and asynchronous signals, as will be understood by one skilled in the art.

The fault tolerant digital processing system 18 shown contains three processor groupings 20 and three corresponding L2 caches 28. Each L2 cache 28 includes a plurality of support logic device inputs and outputs coupled to the microprocessor 24 through microprocessor bus lines 32. One skilled in the art would recognize that the processor grouping 20 and L2 cache 28 includes any type of cache or none at all. The L2 cache 28, in alternate embodiments, includes finite state machines or pipelined logic stages that operate synchronously, under the control of the microprocessor 24 from microprocessor bus line 32. Pipeline stages simplify isolation of processors from fault logic delays, as will be discussed later.

These components may include a memory system, a memory controller, a system memory, or a bus interface controller. Each support logic device also includes a plurality of support logic device outputs coupled to CPU 24 through line 34 and output synchronizing logic 30 through the output bus line 27.

The fault logic stage 22, coupled to each processor grouping 20 through the synchronizing circuitry 30 via bus lines 38, is used for fault detection and masking. The fault logic stage 22 is responsible for detecting output errors, masking output errors and signaling processor mismatches to substantially all processor groupings 20. Each processor grouping output is compared one with another by a fault logic stage 22 at each clock cycle. The Fault logic stage 22 detects logic errors by comparing the output vectors of each processor grouping with the output vectors of each other processor grouping. An error is detected if any processor grouping output vector is in disagreement with any other processor grouping output vector. If any errors (or no errors) are detected and a majority of output vectors are in agreement, a response to each processor grouping 20 is generated through the stage of the Input & Control Signal Drive 50. If any errors are detected and a majority of output vectors are not in agreement, a response to each processor grouping 20 is generated through the No Majority Control Logic stage 54. The fault logic stage 22 masks output errors by voting the processor grouping output vectors. The fault logic stage 22 includes cross-correlating fault detection logic (FDL) 40 and fault mask logic (FML) 42. The operation of the FDL 40 and FML 42 is described in more detail below.

The fault logic stage 22 masks up to M processor grouping output errors, where M=floor ((N−1)/2) and N=number of processor groupings. The fault logic stage 22 compares the output vectors of each processor grouping with each of the other processor grouping. Output vector comparison is selectively done on a bit by bit basis, with output vector equality occurring if and only if all the selected bits of one vector are equal to the corresponding selected bits of the other vector. Bit selection is done on the basis of whether the signal is synchronous or asynchronous, and whether the signal is always valid or valid based on the state of other output values. For all signals, comparison is only made if the conditions occur whereby the signal is valid. For asynchronous signals, comparisons that indicate differences must be different for two consecutive clocks before an output vector inequality is determined. No error exists in the system if all output vectors are equal to each other. An error is detected if this condition is not met. If an error is detected, normal system operation continues if a majority of the processor output vectors are equal to each other. The Fault Mask Logic is applied, bit by bit, using simple majority (Voting) logic. To further illustrate, a '1' occurs in an output bit if the majority of inputs is '1', no ties allowed, otherwise the output is '0'. For a system with m processor groupings with n processor groupings required for a majority, where n=ceiling ((m+1)/2), all, M=(m!)/((n!)*(m−n)!), combinations of inputs must be used. If any of these M combinations is a '1' then the masked output is a '1', otherwise the masked output is a '0'.

An alternate implementation may be employed in which two or more of the M processor groupings require output vector agreement. During the clock cycle in which each error is detected, majority/minority status is registered by the fault control register and is used to reconfigure the M processor groupings into M' groupings where M'=M−N. In this formula, N is the number of minority processor groupings in the clock cycle under consideration. Fault detection and fault masking are subsequently reconfigured to only consider the M' reconfigured set of processor groupings. This scheme is applied sequentially at each clock cycle. Software subsequently uses the fault control register to permanently lock out any processor grouping. Software also operates to resynchronize a subset (or the entire set) of the processor groupings (both minority and majority). This alternate logic scheme is useful when the likelihood of multiple errors in a single clock cycle is much less than the likelihood of a single error in a clock cycle.

The FDL 40 is in operative communication with fault control and status registers 44, and the FDL 42 is in operative communication with an output synch unit 46. Free of faults, the synchronized and connected output is then transmitted along the system bus 48 to the multiplicity of input control and signal drive 50. The synchronized and connected output is also transmitted to the memory and I/O systems 52 comprising the remainder of the digital system. The fault control and status registers 44 output is communicated to the no majority control logic 54. In the event of no processor grouping majority, the no majority control logic 54 directs the reset and toggle control 56 to reinitialize the fault tolerant digital processing system 18 and request switch over to another computational system. If no other computational system exists or if toggle is disabled, no switch over occurs; and the fault tolerant digital processing system 18 starts up from a reset.

The fault control and status registers 44 capture the state of the FDL 40 and the latch outputs, indicating the majority/minority status of each processor group 20. These registers also store control settings used to configure the fault detection logic 40 and the fault masking logic 42. This allows the fault logic stage to be used with one or more processor grouping. The number of groupings is determined by either: hardwired pin programming, software programming, or the current state of the fault status and control registers. The outputs of these registers are also used to signal mismatch detection to processor interrupt control logic for software fault detection response in the event of at least one majority processor. These outputs are also used to signal "reset" and "toggle control" logic by requesting a switch over to another computational system and a subsequent reset of the fault tolerant digital processing system 18, in the event of no majority processor. These outputs are also used to control output enabling of bi-directional signal drivers in the input and control signal drive 50 circuitry. These drivers are only disabled in the event that the corresponding processor grouping is in the minority.

Each processor group signal from the input and control signal drive 50 originates from individual buffers. Resultantly, faults occurring in an errant processor group 20 do not propagate to the remaining processor groups 20. Fault logic 22 provides minority/majority status to disable all bi-directional outputs originating from the input and control signal drive 50. This protects the bus drive circuitry from damage due to faulty processor group(s) 20 erroneously driving the bi-directional buses, while the corresponding input and control signal drive 50 is attempting to correctly drive these buses.

Latent fault scrubbing software is also installed on and executed by the processor. The latent fault scrubbing software is invoked periodically in order to prevent accumulation of unobserved faults in the processing groupings. The execution rate is also concurrently tuned for the desired degree of protection from transient upsets.

Figure 3:
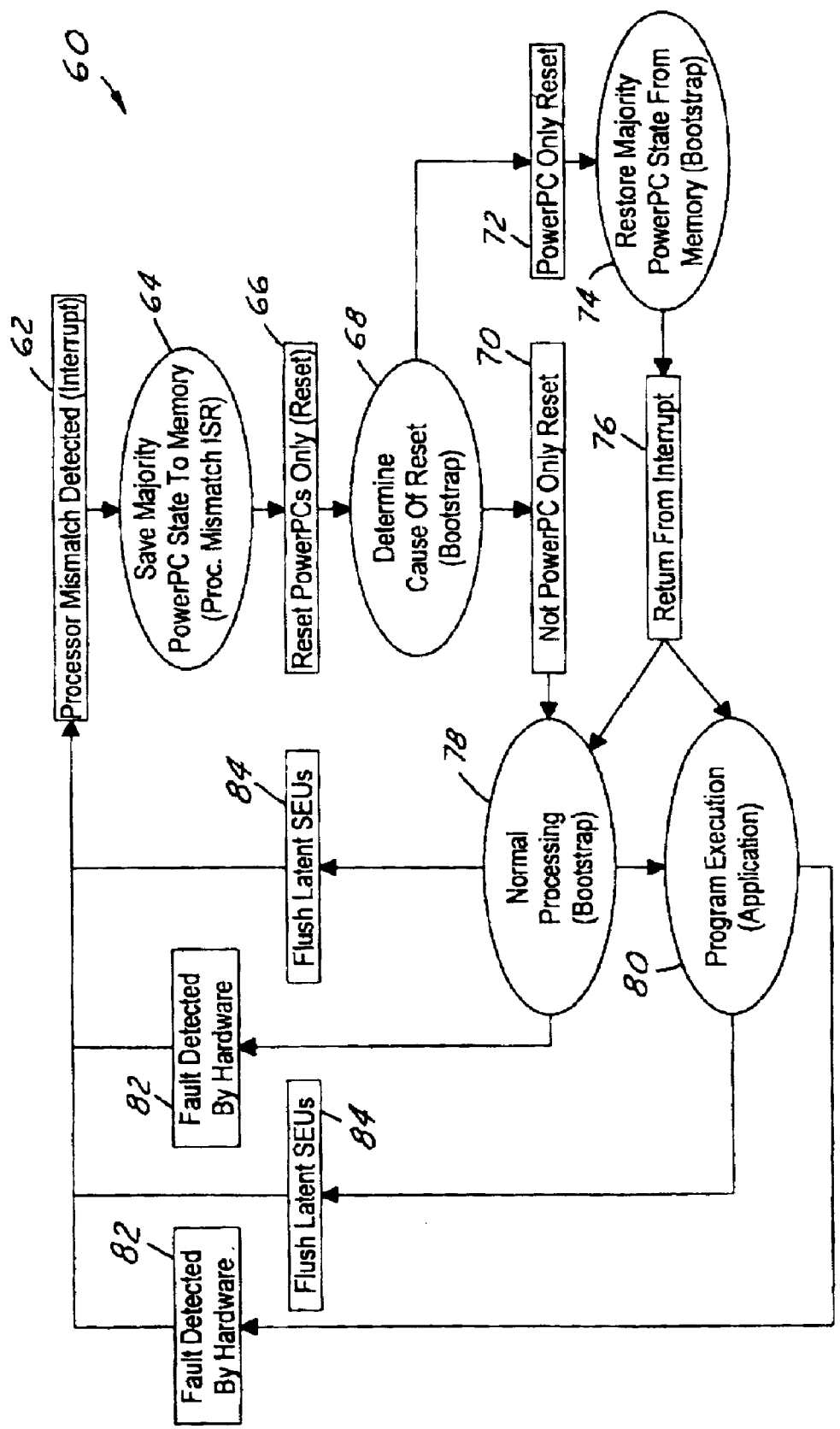
FIG. 3 schematically illustrates fault tolerant digital processing system software in accordance with one embodiment of the present invention.

Referring to FIG. 3 in view of FIG. 2, fault tolerant digital processing system software 60 is illustrated in accordance with one embodiment of the present invention. The software starts by determining the cause of reset (Bootstrap) 68 after the processing grouping 20 releases the processing group reset. The software first performs any initialization required to get the processing group 20 into a predetermined state. This is accomplished by execution of register loads and synchronizing instruction sequences, which, in proper combination, set the processor grouping 20 internal registers and memory to known states. At this point, the processor groupings 20 are synchronized. They are executing identical software and have the same register and memory values. As such, they are in the same state. After the processor groupings have been synchronized, the system 60 determines the cause of reset 68.

If the reset was not a PowerPC only reset 70, then normal initialization software (Bootstrap) commences. In the absence of faults, normal processing (Bootstrap) 78 ends by beginning program execution 80 and program execution completes as dictated by the application software.

In the presence of faults, processor mismatch interrupts 62 will be issued periodically by the fault detection logic by hardware 82. Additionally, execution to flush latent SEUs 84 will occur periodically controlled by software generation of the processor mismatch interrupt 62. Both hardware generated processor mismatch interrupt 82 and latent SEU flushing 84 occur during both normal initialization software (Bootstrap) execution 78 and program execution 80.

Processor mismatch interrupt 62 response starts by entry into the processor mismatch interrupt service routine (ISR) 64. This ISR saves, through the fault mask logic 42, the PowerPC state to memory. This state is the majority PowerPC state, due to the operation of the fault mask logic 42, described above. The software then commands the I/O system to resynchronize the PowerPCs 66 while resetting only the processor groupings 20 and leaving the state of the rest of the digital processing system unaltered.

Upon startup from reset, the software determines the cause of reset (Bootstrap) 68. The cause of reset will not be, as above, not a PowerPC only reset, since the reset was initiated in response to a processor mismatch interrupt 62. Because the reset was a PowerPC only reset 72, the restore majority PowerPC state from memory function 74 restores the state of all the processors to the PowerPC state saved during the majority save 64. This state is the majority PowerPC state, which was saved to memory at the time the processor mismatch interrupt 62 was first serviced by the ISR.

During restoration of the PowerPC state 74, the fault detection logic status is recorded and the status and control registers are loaded. This is typically done with all processor groupings 20 in control and all in processor groupings 20 in the majority. At this time, diagnostic routines are run to determine the desirability of removing one or more processor grouping 20 from the fault detection logic 40 and the fault masking logic 42. The fault control and status registers 44 are loaded by software to effect removal of processor groupings 20 from the fault logic 22.

After restoring the state of all the PowerPC states and possibly reconfiguring the fault logic 22 in the cause of reset 68, all the remaining processor groupings 20 are again in the identical state and executing identical software. When this occurs, the software returns from interrupt 76 and cycles to the next instruction in the stream of instructions that was created by the processor mismatch interrupt 62. If the interrupted instruction stream was in normal bootstrap processing 78, then instruction execution resumes to normal processing 78. If the interrupted instruction stream was in program execution processing, then application execution resumes 80. Regardless of which execution occurs, instruction sequencing of either is preserved with the correct digital processing system states throughout instruction execution.

The instruction sequencing from processor mismatch detection 62 to save majority PowerPC sate to memory 64 to reset PowerPC only 66 to determine cause of reset 68 to either PowerPC or not Power PC only reset and culminating in return from interrupt 76 can not be interrupted in any manner in which the resultant processor grouping state save and subsequent processor grouping 20 state restore leaves any properly operating processor grouping 20 in a state substantially different from the state of the majority processor grouping 20 at the time the processor mismatch interrupt was serviced.

The normal processing (Bootstrap) 78 and the program execution (Application) 80 also start execution of the processor mismatch interrupt response applications to resynchronize the PowerPC. This step is operative to limit the time that faults can reside undetected in the processor.

In order for the normal processing (bootstrap) 78 and the program execution (application) 80 to find faults detected by hardware 82, fault detection logic 42, and to flush latent SEUs in the flush latent SEU 84 (via the processor mismatch interrupt 62), the processor mismatch interrupt must be enabled and unmasked for response by the processor grouping 20, that executes the software of FIG. 3.

In order to accommodate time critical software, software provides the ability to disable/mask and subsequently enable/unmask the processor mismatch interrupt. This allows routines that have very low latency requirements or that operate in high rate bursts to function within the system timing parameters that may be violated by interruption of these routines by the processor mismatch interrupt response with its subsequent state save, reset, and state restore interference.

In operation, in view of FIG. 2, the fault tolerant digital processing system uses the processor groupings 20 along with the synchronization circuit 21 to monitor the state of each processor grouping 20 and applies resynchronization sequences to the processor groupings 20 in order to correct the state of minority processor groups 20 in the presence of transient faults. This, in conjunction with the FML 42, reconfigures the system to prevent hard faults in minority processor groups 20 from affecting the system memory and I/O 52 during normal operation, processor group initialization and resynchronization. The synchronization hardware 46 cooperates with the recovery software of FIG. 3 in maintaining identical processing group states from release of reset forward. Thus, to the intended application, the operation of the digital system 18 is functionally equivalent to an identical, faultless single processor group system.

In the absence of faults, processor group execution occurs in lock step with each other processor group such that on each system clock edge, processor group outputs are identical. The synchronized processor group outputs simultaneously feed the FDL 40 and FML 42. The fault logic stage 22 generates a common set of outputs subsequently communicated to the system memory and I/O 52.

When fault tolerant digital processing system 18 is reset through a reset input, all of the CPUs 24 and all of the support logic devices 28 are set substantially to the same state. When fault tolerant digital processing system 18 starts running, each individual processor grouping 20 runs in lock step with all the other processor groupings 20. Typically, all processor groupings 20 will agree on any outputs that they generate (this is the non-fault state of fault tolerant digital processing system 18). In the event that one processor grouping 20 generates a signal that is in disagreement with the other signals, FDL 40 signals the software to initialize the recovery process.

In the recovery process, all processor groupings are interrupted by fault logic stage 22 indicating that a fault has occurred. When interrupted, the remaining processor groupings 20 start saving any vital state information into the fault control and status register 44. Any processor grouping containing faults potentially generates a different output stream in response to the input stream provided by the plurality of input control and signal drive 50. That difference, however, will be prevented from effecting the processor groupings 20 and the memory and I/O (Remainder of computer system) by the FML 42. The interrupt process functions by: responding to the processor mismatch interrupt; saving the majority processor groupings state; resetting all the processor groupings 20 (both minority and majority); and restoring the processor groupings 20 state and returning from processor mismatch interrupt. Upon completion of this interrupt process, all processor groupings 20 start executing code again with the overall behavior of a sequence of instructions interrupted by normal interrupt mechanisms.

Typically, when a processor group error occurs, the present invention will successfully save vital information, resynchronize the processor group 20 and resume normal execution of code. However, in alternate scenarios, it is possible for upsets to occur while the fault stage 22 is attempting to recover from a previous error. While the recovery interrupt is being processed, the FDL 40 continues to monitor the outputs of the remaining processor groupings 20. When the FDL 40 detects further disagreements, such that no majority of the remaining processor groupings 20 exist, it declares a fatal error and immediately resets all processor groupings 20 through the no majority control logic 54. Once processor groupings 20 have all been reset, the fault tolerant digital processing system 18 will start executing code from a hardware defined operating step (normally the digital processing system 18 reset condition).

In broad terms, the FDL 40 compares identical signals from each processor group 20 to determine the majority/minority status of each signal. All signals from a processor group must be in the majority in order for that processor group to be declared in the majority. Conversely, a processor group is in the minority if any of its signals are in the minority. A signal is determined to be in the majority if more than half of the synchronized outputs for that signal of the respective processor group are in the same state.

Generally, processor grouping faults resulting from SEUs fall into one of two categories: "observed" (those altering the processor grouping output and subsequently the processor grouping external state); and "unobserved" (those altering the processor group internal state, but not yet altering the processor grouping output(s)). Faults affecting the latter are referred to as "latent" faults. In time, these latent faults can propagate to the processor grouping output and become "observed" faults. They can also be overwritten during algorithm execution and thereby eliminated.

Several fault cases tend to exist in three-processor systems. The first case describes an observed SEU from reset release in a single processor group. From reset release, all processor groups operate in lockstep with identical external data, and identically maintained internal states. In the event a SEU results in a processor group internal state disagreeing with the remaining processor group internal states and the SEU propagates to alter the processor groups external state (i.e. an observed fault), the processor group associated with the SEU becomes the minority processor. The processors without the SEU then become the majority processors. Concurrently, a processor group mismatch is signaled by the fault detection logic 40. Thereafter, the fault mask logic 42 is used to mask the effects of the minority processor group from propagating to the remaining processor groups. The fault mask logic 42 then identifies the minority and majority processor groups. This identification is synchronously determined and latched at the processor group external clock rates. The fault mask logic 42 then uses the majority processor group outputs such that the output to the memory and I/O is unaffected by the SEU.

An alternate example is essentially the first case with the added occurrence of a subsequent second SEU. If the second SEU occurs in the same processor group that experienced the first SEU, the overall processor group minority and majority status will remain unchanged, and the overall output of the system will be unaffected by the subsequent SEU. If, however, a second SEU occurs in a different processor group than that which experienced the first SEU and causes the second processor group internal state to disagree with the remaining unaffected processor group, the overall output of the system may be affected. In other words, if the effect of only one of the SEUs propagates to the processor group external state (one observed, one latent), the processor group with the observed SEU becomes a minority processor, and the processor groups without an observed SEU become the majority processors. One of the majority processors still, however, has a latent SEU. The FDL 40 and FML 42 then continue as described above to use the majority processor outputs as the overall system output to the application. If, however, subsequent to the first SEU, the second SEU propagates to respective processor group external states (two processors with observed SEUs), in a three-processor group system, all processors will become minority processors. The fault control and status registers 44 then indicate that no processor is in the majority, thereby activating the no majority control logic 54. A digital processing system reset then operates to prevent memory and I/O system state corruption and to re-synchronize the system.

SEU recovery is initiated only after the effect of an SEU propagates to the output of the affected processor group and is detected by FDL 40. In such cases, FML 42 will mask the single SEU. However, a mismatch interrupt is generated and noted in the fault control and status registers 44. At this point, only one of the processor groups status logic signals will indicate that it is not in the majority, i.e. it is in the minority. The FDL 40 then responds by generating the processor mismatch interrupt. If the processor mismatch interrupt is not disabled or masked by the operating software, then alternate software responds to this condition by: flushing the processor grouping caches to the memory in 52; saving the data in the processor groupings internal registers and memories to the memory in 52; and simultaneously only resetting the processor groups 20 and setting the SEU reset status. In simple terms, upon removal of the processor only reset, the processor groupings all start at a known state, thereby synchronizing the processor group's internal states with each other and clearing the SEU. A software initialization routine then executes from the reset release. If the SEU reset status is set (latched), then software restores the internal registers and memories, but not caches of each respective processor groups and resets the state of the fault control and status registers 44. At this point the processor groupings and the fault logic 22 is in a recovered state and the software returns from the processor mismatch interrupt routine. The overall system execution then proceeds substantially and functionally identical to a system without an SEU.

In the case of two SEUs in the same processor group, where both SEUs propagate to the same processor group output (both observed), the recovery and response of the system is the same as that just described for a single SEU recovery process.

If, however, an observed SEU occurs in two different processors of a three-processor group system, then no processor group will be in the majority. As a result, the no majority control logic 54 is activated thereby signaling a fatal error requiring a toggle (Switch to backup) or digital processor system 18 reset. Such a reset will simultaneously reset all processor groups 20. This synchronizes the processor group's internal states with each other thereby clearing the SEUs. The initialization software then executes from the reset release, starting the processor groups in the same manner as they were started without the intervention of an SEU. The SEU reset status and fault control and status registers 44 are reset as a result of the toggle or digital processing system reset. Since all processor groups are reset, and no internal register states are restored, the application software is invoked and the system operation proceeds from application initialization.

The following example describes the operation of the FDL 40 and FML 42 in the case of an observed SEU in the presence of a latent SEU. In such a case, the recovery process will initiate only after the effect of observed SEU propagates to the fault detection logic 40, i.e., it is observed. If the second SEU has not yet propagated to the output of its affected processor group and both the observed and latent SEUs are in the same processor group, then the system performs the same recovery process as in the case of an observed SEU in a single processor as described above.

If however the observed and latent SEUs occur in different processors, the system will initiate the response the same as for the SEU recovery process for an observed SEU in a single processor. If or when during the recovery process, the latent SEU propagates to the output of the affected processor group, the result will be that two SEUs, having propagated to two processor group outputs, are observed. Accordingly, the system will perform in response for the SEU recovery process with two observed SEUs in two different processor groups as described above. In other words, no processor is in the majority and a fatal error toggle/hard reset is generated. This simultaneously resets all of the processor groups and synchronizes the processor group's internal states with each other thereby clearing the SEUs. The software initialization routine then executes from reset release with the SEU reset status bit reset by the digital processor system n18 reset or toggle. The fault control and status registers will be reset. Normal initialization then proceeds by invoking application software such that system operation proceeds from application initialization.

To provide additional latent SEU protection, the system limits the time that the data can reside in a processor group. This is accomplished by adjusting the maximum data latency time and thereby effectively tuning the processor group SEU rate. This is due to the fact that the expected time to observe upsets in two processor groups (for a three processor group system) is inversely proportional to the time that a fault is able to reside in a processor group undetected (i.e. a latent fault). An example of how to enforce a limit on undetected faults is to periodically force the SEU recovery process to execute.

Thus, if any faults have accumulated without propagation to the processor group outputs to become observed, the SEU recovery process will either overwrite internal faults or propagate them to the processor grouping output. This is because in order to save a processor group state for subsequent recovery, the entire state must be saved in the memory 52.

Another example of limiting the time the data can reside in the processor group is to periodically flush or refresh part of the internal storage registers and memories. A predetermined number of flush or refresh cycles would thereby completely refresh the processor group.

From the foregoing, it can be seen that there has been brought to the art a new and improved voted processing system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A satellite system 10 comprising:
   a ground station 14;
   a satellite 12 in operative communication with said ground station 14, said satellite 12 including a fault tolerant processing circuit comprising:
   at least three processor groupings 20 each of said at least three processor groupings 20 having a plurality of processor grouping inputs and a plurality of processor grouping outputs;
   a synchronizing circuit 21 comprising a plurality of output synchronizers, each output synchronizer in operative communication with a corresponding respective processor grouping for synchronizing the output of each processor grouping;
   a fault logic circuit 22 in operative communication with said synchronizing circuit 21, said fault logic circuit 22 comprising a fault detection circuit and a fault mask circuit, said fault logic circuit 22 adapted to compare said plurality of processor group outputs to detect errors in any one of said plurality of processor group outputs through selecting bits from said processor group outputs, wherein bit selection is generated as a function of whether a first one of said plurality of processor group outputs is synchronous or asynchronous and whether said first one of said plurality of processor group outputs is always valid or valid based on a state of a second one of said plurality of outputs;
   a control logic circuit for resetting each of said at least three processor groups when none of said at least three processor groups is in a majority of said processor groups, wherein said fault mask circuit is adapted to mask the output of a respective processor grouping associated with a detected error and signal a detected error; and
   a system bus coupled to each of said plurality of processor group inputs and said fault logic circuit output.

2. A fault tolerant processing circuit 18 according to claim 1 wherein said synchronizing circuit 21 further comprises continuously active synchronization signals.

3. A fault tolerant processing circuit 18 according to claim 1 wherein said synchronizing circuit 21 further comprises periodically active synchronization signals.

4. A fault tolerant processing 18 according to claim 1 wherein said synchronizing circuit 21 further comprises logic operative to synchronize a JTAG TCLK with said processor system clock.

5. A fault tolerant processing circuit 18 according to 1 wherein an expected rate of transient faults is tuned by said latent fault scrubbing rate.

6. A satellite system 10 according to claim 1 wherein said at least three processor groupings 20 comprises:
   a central processing unit (CPU), having an operating step executed during a clock cycle and operating synchronously with each other CPU 24, each operating step of each CPU 24 being accomplished in parallel and substantially simultaneously with each of the other at least three CPUs 24 each clock cycle, each of said at least three CPUs 24 having a plurality of CPU inputs and a plurality of CPU outputs; and
   a respective support logic device coupled to said plurality of CPU inputs and said plurality of CPU outputs and having a plurality of support logic device inputs and outputs coupled to said respective CPU 24.

7. A satellite system 10 according to claim 1, wherein said fault logic circuit 22 resets each of said at least three processor groups upon detecting a fault and, in response, each of said at least three processor groups restart at a hardware defined operating step.

8. A satellite system 10 according to claim 3, wherein said fault logic circuit 22 interrupts said at least three processor groups when one of said processor groups has a fault, whereby each of said at least three processor groups without detected faults store state information and said fault logic circuit 22 resets each of said at least three processor groups after said state information is stored to restart said at least three processor groups at a state defined operating step.

9. A satellite system 10 according to claim 3, wherein said fault logic circuit 22 interrupts said at least three processor groups when a minority of said processor groups has a fault, and wherein each of said at least three processor groups without an error stores state information and said fault logic circuit 22 resets each of said at least three processor groups after said state information is stored to restart said at least three processor groups at a state defined operating step.

10. A satellite system 10 according to claim 8, wherein said fault logic circuit 22 includes fault control and status registers for storing said state information.

11. A satellite system 10 according to claim 1, wherein each of said at least three processor groupings includes a memory system.

12. A method of masking the effect of a single event upset in a fault tolerant processing system 18 including at least three processor groups, each processor group including a CPU 24, an input, an output, and a support logic device, said method comprising the steps of:
   monitoring each of said plurality of processor group outputs;
   detecting an error in one of said processor group outputs by comparing the outputs of each of said at three processor groups against each other through selecting bits from said processor group outputs, wherein bit selection is generated as a function of whether a first one of said plurality of processor group outputs is synchronous or asynchronous and whether said first one of said plurality of processor group outputs is always valid or valid based on a state of a second one of said plurality of processor group outputs;

classifying each processor group as a majority processor group or minority processor group, said majority processor groups all having equal value outputs and comprising a majority of all processor groups, said minority processing groups each having an output different than each majority processing group;

when any processor group is classified as a minority processor group, storing state information for at least one of said processor groups classified as a majority processor group;

simultaneously resetting each of said processor groups to restart at a state defined operating step; and restoring said stored state information to each of said processor groups.

13. A method according to claim 12 wherein, when no processor group is classified as a majority processor group, simultaneously resetting each of said processor groups and initializing each of said processor groups to restart at a state defined operating step.

* * * * *

UNITED STATES PATENT AND TRADEMARK OFFICE
CERTIFICATE OF CORRECTION

PATENT NO.   : 6,938,183 B2
DATED        : August 30, 2005
INVENTOR(S)  : Robert E. Bickel It is certified that error appears in the above-identified patent and that said Letters Patent is hereby corrected as shown below:

<u>Column 14,</u>
Line 8, after "to" insert -- claim --.

Signed and Sealed this

First Day of November, 2005

JON W. DUDAS
*Director of the United States Patent and Trademark Office*